Feb. 19, 1952  A. C. REID  2,586,259

AZIMUTH TRANSMITTER

Filed May 2, 1951

INVENTOR:
ALBERT C. REID
BY Newell Pottorf
ATTORNEY

Patented Feb. 19, 1952

2,586,259

UNITED STATES PATENT OFFICE 2,586,259

AZIMUTH TRANSMITTER

Albert C. Reid, Tulsa, Okla.

Application May 2, 1951, Serial No. 224,238

10 Claims. (Cl. 177—380)

1

This invention relates to determining and recording directions or bearings and is directed particularly to an azimuth transmitter for producing electrical signals indicative of direction, in a form suitable for making a permanent record with an oscillographic or similar recorder.

Although the invention has been especially adapted for use with the type of recorder employed in seismic geophysical surveying and will be described herein with specific reference to such use, its utility is by no means limited to seismic surveying but extends to analogous fields wherever suitable recorders are available and it is desired to determine and make permanent records of direction.

In seismic geophysical surveying it is always desired and is often essential to know the direction of the seismic detector line. It is generally the duty of, and a simple matter for, the operator of the seismic recording equipment to determine and report this information, but errors either of observation or of reporting have occurred often enough to cause concern and difficulty. Thus, a device capable of generating electrical direction signals suitable for recording by the seismic recording camera can both prevent such errors and provide a record in permanent form for later reference either as the primary direction data or as a check on the visual observation and reporting.

A primary object of my invention, therefore, is to provide a relatively simple and inexpensive device by which a given unknown direction can be determined and recorded with an oscillographic or similar recorder. Another object is to provide an apparatus by which a direction or bearing can be translated into electrical signals of a form suitable for recording by a recorder of the type used in seismic geophysical surveying. Further and more specific objects may be briefly stated as, to provide a direction-signal generator: which is self-energized, requiring no batteries or like internal or external voltage supply; which produces similar signals for both the reference and the bearing directions, so that the accuracy of the determinations cannot be affected by varying phase shifts in the recording system; and which is reasonably rugged, easily portable, and not objectionably bulky. Still further objects, uses, and advantages of the invention will become apparent as the description proceeds.

In general the foregoing and other objects are accomplished by a direction-signal generator comprising two spaced bar magnets mounted on a mandrel so as to project radially therefrom, one

2 of the magnets being rigidly attached to the mandrel, while the other is pivoted freely thereon so as to be able to align itself in the earth's magnetic field. Mounted on a spool or frame, which is between the two magnets and rotatable about the mandrel as an axis, are two small coils so positioned that each moves along a circle past a pole of one of the magnets when the spool is rotated on the mandrel. The resultant voltage pulse as each coil passes the pole of its adjacent magnet is then transmitted by appropriate conductors to the recording system, where a record is produced on which the spacing in time of the pulses from the respective coils accurately indicates a bearing, when the speed of rotation of the spool is maintained substantially uniform.

This will be better understood by reference to the accompanying drawings forming a part of this application and showing by way of illustration a preferred embodiment of the invention. In these drawings, wherein the same reference numerals designate the same or corresponding parts in the different figures.

Figure 1:
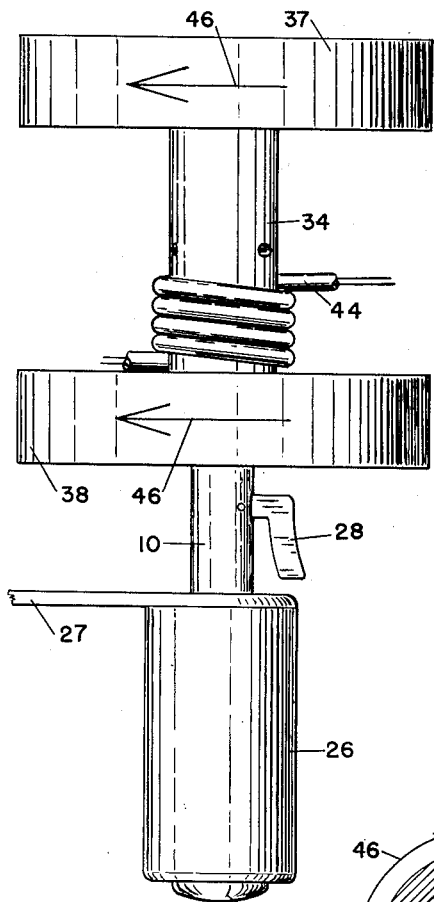
Figures 1 and 2 are, respectively, elevation and cross-sectional views of the preferred embodiment of the invention.
Figure 2:
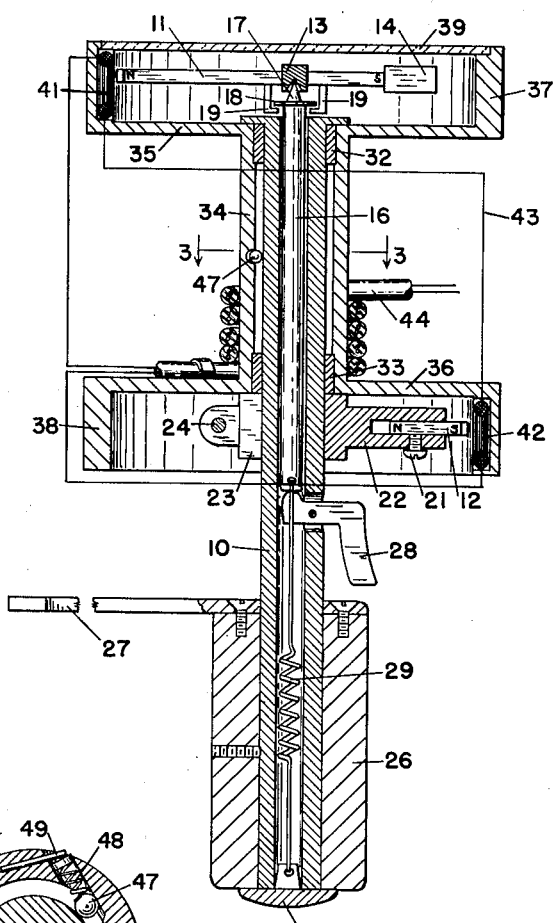

Referring now to these drawings in detail, and particularly to Figures 1 and 2 thereof, the direction signal generator embodying my invention comprises a tubular mandrel 10 on which are mounted two bar magnets 11 and 12 spaced somewhat apart and oriented radially relative to the mandrel axis. The magnet 11 may, for example, be the needle of a surveying compass having a pivot bearing 13 and with its south-seeking end cut off and replaced by a balancing weight 14 of nonmagnetic material such as brass.

Extending part way through and projecting from the upper end of mandrel 10 is a rod 16 carrying at its top end a pivot 17 to engage bearing 13 and a flange 18 to engage clamping arms 19 attached to and projecting downwardly from magnet 11, curving inwardly under flange 18. With this arrangement, movement of rod 16 downwardly clamps arms 19 between flange 18 and the end of mandrel 10 to hold magnet 11 firmly fixed, while raising rod 16 upwardly unclamps the arms 19 and engages pivot 17 in bearing 13 so that magnet 11 can turn freely to orient itself in a magnetic field.

The magnet 12, which may suitably be the portion cut from magnet 11 and replaced by weight 14, is retained by a set screw 21 in a slot on the end of a radial arm 22 which projects radially from a split ring 23 encircling mandrel 10, to which it is adjustably clamped by tightening a screw 24.

On the lower portion of mandrel 10 is fixed a handle 26 and an index pointer 27 which is to be pointed in or aligned with the unknown direction (and by the term "unknown" herein, it is intended to designate simply the direction to be recorded, regardless of whether it is, in fact, known or unknown). Contacting the lower end of rod 16 is a pivoted lever or trigger 28 which extends through an opening in the wall of mandrel 10, while a tension spring 29 connected between the lower end of rod 16 and a cap 30 at the bottom end of mandrel 10 pulls rod 16 downwardly to clamp the magnet 11 to the mandrel at all times except when rod 16 is lifted by pressing on trigger 28.

Journaled by bearing sleeves 32 and 33 for rotation about mandrel 10 as an axis is a nonmagnetic frame or spool 34 having flanges 35 and 36 with the respective cylindrical rims 37 and 38. The inside diameters of rims 37 and 38 are preferably the same and are just sufficient to clear the outer tips of magnets 11 and 12. The height of the rims is preferably enough to form protective enclosures for the respective magnet assemblies, upper rim 37 in particular being closed by a transparent cover plate 39 to keep dust and the like away from pivot 17 and bearing 13 while still permitting observation of the magnet 11.

In recesses formed on the insides of rims 37 and 38 are respectively cemented small wire coils 41 and 42, which are connected in series, as is diagrammatically indicated by the conductor 43, and to the two conductors of a flexible two-conductor cord 44, one end of which is clamped or otherwise mechanically fastened to the spool 34. In use, several turns of cord 44 are wrapped around spool 34 and the free end of the cord is electrically connected by a polarized plug or connector (not shown) to the oscillographic recording circuit. Then by pulling on cord 44 while holding the instrument by handle 26, spool 34 is rotated on mandrel 10, and pulses of voltage are induced in coils 41 and 42 each time one of them passes close to the pole of its adjacent magnet 11 or 12.

Figure 3:
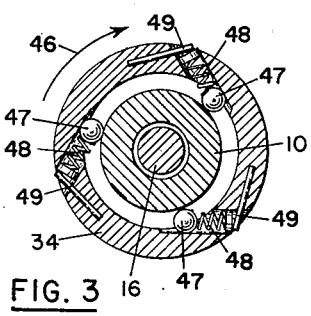
Figure 3 is an enlarged cross-section view taken on the line 3—3 in Figure 2.

The preferred clockwise direction of rotation of the spool 34, as marked by the arrows 46 on rims 37 and 38, may be made certain by mechanism which permits rotation in one direction only, such as the ball-clutch arrangement shown in Figure 3. Thus if incorrect rotation is attempted, the balls 47, in inclined holes drilled through the wall of spool body 34 and pressed against mandrel 10 by springs 48 retained by pins 49, wedge between the spool and mandrel, locking them against relative rotation; whereas, for the correct clockwise rotation indicated by arrow 46, the action of the balls is an unlocking one, permitting free rotation.

The initial adjustments of the instrument are preferably made as follows: The pulses produced by the respective coils 41 and 42 upon rotation of spool 34 are first made to have opposite polarity and unequal amplitude. If necessary, the relative polarity is most simply changed by turning the magnet 12 end-for-end in the slot of arm 22, and the relative amplitude is varied by moving the magnet 12 lengthwise, either closer to or farther from the path of coil 42, as required. A suitable amplitude ratio is one where the pulse amplitude from coil 42 is about half that from coil 41.

A directional calibration of the instrument is then carried out by pointing index 27 toward the geographical north, pressing trigger 28 (while holding mandrel 10 vertical) to unclamp magnet 11 which then swings and comes to rest pointing toward magnetic north, and then releasing trigger 28 to reclamp magnet 11. With screw 24 loosened, collar 23 and arm 22 are rotated as necessary around mandrel 10 so that, as spool 34 turns, coils 41 and 42 respectively pass the tips of magnets 11 and 12 exactly simultaneously. Thus, whenever index 27 points north and magnet 11 is simultaneously aligned with the magnetic north, the voltage pulses in the two coils occur simultaneously (as spool 34 is rotated) and therefore superimpose to give a single resultant pulse of about half the amplitude of that from coil 41 alone. This adjustment is fixed by tightening screw 24, and once made, automatically excludes the effect of the magnetic declination, remaining the same until the declination changes.

In operation any unknown direction is recorded by pointing index 27 toward it and, by pressing trigger 28, allowing magnet 11 to swing and come to rest on magnetic north, trigger 28 then being released to clamp the magnet 11 in this angular orientation relative to magnet 12. Several turns of cord 44 are wrapped on spool 34, and electrical connections are made to the recorder. Holding the instrument by handle 26, the operator then spins spool 34 at as uniform a speed as possible for several seconds by pulling on cord 44, during which time the recorder is run briefly to make the record.

Figure 4:
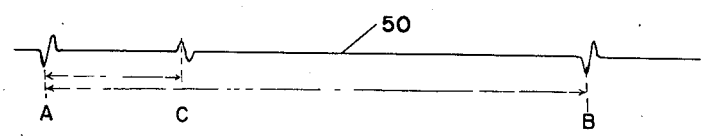
Figure 4 shows representative record traces obtained using the invention.
Figure 4:
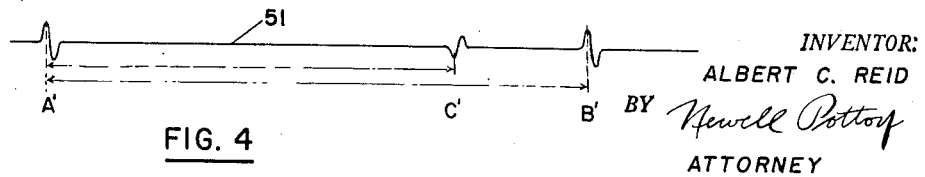

A sample record made with index 27 pointing, for example toward the east, and with spool 34 being rotated clockwise, is shown in Figure 4 as trace 50. Pulses A and B are those due to coil 41 passing magnet 11 and hence their spacing in time (or in length if it can be assumed that the recording medium was moved at uniform speed) represents 360 degrees of rotation of the spool 34. Pulse C is that due to coil 42 passing magnet 12, and the interval or length AC thus represents that fraction of one revolution of spool 34 between the time coil 41 passes magnet 11 and the time coil 42 passes magnet 12. Any bearing X in degrees is thus given by the simple equation $$\text{Azimuth angle } X = \frac{AC}{AB} \times 360°$$

and for the direction East, $$\frac{AC}{AB} = \frac{1}{4}, \text{ or } X = 90°$$

No harm is done if it happens that the connections to the recorder are reversed in polarity, as the "reference" and the "unknown" pulses are readily distinguished by their relative amplitudes. Thus, the trace 51 of Figure 4, with the pulses reversed in polarity, is the type of record obtained with reversed connections and with index 27 pointing West, or, as before $$\text{Azimuth angle } X' = \frac{A'C'}{A'B'} \times 360° = \frac{3}{4} \times 360° = 270°$$

While my invention has been described in terms of certain specific details, some of these are subject to considerable variation to suit particular recording systems. For use with a seismic recorder, coils 41 and 42 are preferably of such a size as to subtend an arc of between 5° and 10° along the circumference of rim 37 or 38. Whatever their size relative to the rim circumference, the width of coils 41 and 42 should be as nearly the same as possible, so that the induced pulses are of the same time duration (or frequency). This avoids needless error due to different phase shifts as the pulses pass through frequency discriminating circuits in the recorder. A satisfactory speed of rotation for spool 34 is about four revolutions per second. With such coil dimensions and speed of rotation, the pulses produced are transmitted satisfactorily through the seismic recording system.

In field use the instrument is typically connected to the recorder in place of one of the seismic detectors and produces quite satisfactory results even if other detectors remain connected in series with it.

In avoiding adverse interaction between magnets 11 and 12 a spacing of 5 inches has proved sufficient, and the uniformity of rotation speed is helped by concentrating an appreciable portion of the instrument mass in the rims 37 and 38. While it has not often been specifically mentioned above, it is to be understood that substantially all parts except magnets 11 and 12 are formed of non-ferromagnetic materials.

While the azimuth transmitter of my invention has been described with reference to the foregoing specific details, it is to be understood that these are for purposes of illustration only and that numerous modifications will be apparent to those skilled in the art. The invention therefore should not be considered as limited to these details but is to be ascertained from the scope of the appended claims.

I claim:

1. An azimuth transmitter for generating direction signals comprising a mandrel, an index magnet projecting radially from said mandrel and adjustably clamped thereto, a compass magnet spaced from said index magnet and pivoted for rotation on the axis of said mandrel, a frame between said index and said compass magnets mounted for rotation about said mandrel as an axis, a pair of coils carried by said frame, each one of said coils being mounted in a position to be carried by said frame in a circle passing close to one of said index and said compass magnets when said frame is rotated on said mandrel, and electrical leads for connecting said coils to a recording circuit.

2. An azimuth transmitter for generating electrical direction signals comprising a mandrel, an arm projecting radially from and adjustably clamped to said mandrel, an index magnet adjustably fixed on said arm, an index member fixed to said mandrel and adapted to be aligned according to a direction to be recorded, a compass magnet spaced from said index magnet and pivoted for rotation on the axis of said mandrel, means for releasably clamping said compass magnet relative to said mandrel, a flanged spool rotatable about said mandrel as an axis between said index and said compass magnets, a coil mounted on each of the two flanges of said spool in a position to be carried in a circle close to the adjacent one of said magnets when said spool rotates on said mandrel, and electrical leads interconnecting the two coils and adapted to be coupled to a recording circuit.

3. An azimuth transmitter as in claim 2 in which each of said two flanges has a cylindrical rim on which said coil is mounted so that its axis is always radial and perpendicular to the mandrel axis.

4. An azimuth transmitter as in claim 3 in which a substantial portion of the weight of the transmitter is concentrated in the cylindrical rims.

5. An azimuth transmitter as in claim 2 in which said magnets are mounted eccentrically relative to the mandrel axis so that said coil passes close to only one pole of the adjacent magnet.

6. An azimuth transmitter as in claim 5 in which the spacing between at least one of said magnets and the adjacent coil is variable, whereby the relative amplitudes of the voltage pulses induced in said coils may be adjusted.

7. An azimuth transmitter as in claim 6 in which the coil interconnecting leads and the magnet polarities are so arranged as to produce pulses of opposite sign and unequal amplitude from said coils.

8. An azimuth transmitter as in claim 2 in which said electrical leads include a flexible cord adapted to be wrapped on said spool for spinning it.

9. An azimuth transmitter as in claim 2 including means for permitting rotation of said spool only in one direction on said mandrel.

10. An azimuth transmitter as in claim 2 in which the width of said coil occupies an arc of between 5° and 10° on said circle.

ALBERT C. REID.

REFERENCES CITED

The following references are of record in the file of this patent:

UNITED STATES PATENTS

| Number | Name | Date |
|---|---|---|
| 2,089,441 | Smith, Jr. | Aug. 10, 1937 |
| 2,403,889 | Di Toro | July 9, 1946 |